(12) United States Patent
Smith

(10) Patent No.: US 9,897,210 B2
(45) Date of Patent: Feb. 20, 2018

(54) KNIFE EDGE SEAL TREE

(71) Applicant: United Technologies Corporation, Hartford, CT (US)

(72) Inventor: Darren M. Smith, Andover, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 54 days.

(21) Appl. No.: 14/853,231

(22) Filed: Sep. 14, 2015

(65) Prior Publication Data

US 2016/0201802 A1    Jul. 14, 2016

Related U.S. Application Data

(60) Provisional application No. 62/089,108, filed on Dec. 8, 2014.

(51) Int. Cl.
| | |
|---|---|
| *F01D 11/00* | (2006.01) |
| *F16J 15/3236* | (2016.01) |
| *F16J 15/3252* | (2016.01) |
| *F16J 15/44* | (2006.01) |
| *F16J 15/447* | (2006.01) |

(52) U.S. Cl.
CPC .......... *F16J 15/3236* (2013.01); *F01D 11/00* (2013.01); *F16J 15/3252* (2013.01); *F16J 15/444* (2013.01); *F16J 15/4474* (2013.01); *F05D 2220/32* (2013.01); *F05D 2240/55* (2013.01)

(58) Field of Classification Search
CPC .. F16J 15/3236; F16J 15/3272; F16J 15/3232; F16J 15/3268; F16J 15/4474; F16J 15/444; F01D 11/00
See application file for complete search history.

(56) References Cited

U.S. PATENT DOCUMENTS

| | | | | |
|---|---|---|---|---|
| 2,888,281 | A * | 5/1959 | Ratti | F16J 15/164 277/366 |
| 3,494,625 | A * | 2/1970 | Sweger | F16J 15/3236 277/356 |
| 3,504,917 | A * | 4/1970 | Malmstrom | F16J 15/3456 277/366 |
| 4,494,759 | A * | 1/1985 | Kieffer | F16J 15/3232 277/367 |
| 4,852,890 | A * | 8/1989 | Borowski | F16J 15/164 277/366 |
| 5,024,450 | A * | 6/1991 | Hawley | F16J 15/3456 277/366 |
| 5,123,297 | A * | 6/1992 | Renk | F16H 57/029 277/505 |
| 2008/0122184 | A1* | 5/2008 | Hocker | F02M 59/442 277/366 |
| 2008/0260522 | A1* | 10/2008 | Alvanos | F01D 11/001 415/173.4 |

(Continued)

*Primary Examiner* — Eugene G Byrd
(74) *Attorney, Agent, or Firm* — Snell & Wilmer, L.L.P.

(57) ABSTRACT

What is described is a tree seal for use on a rotating element. The tree seal includes a trunk configured to be coupled to the rotating element. The tree seal also includes a first branch coupled to the trunk and having a first edge configured to form a first mini seal with a housing. The tree seal also includes a second branch coupled to the trunk and having a second edge configured to form a second mini seal with the housing.

17 Claims, 4 Drawing Sheets

(56) References Cited

U.S. PATENT DOCUMENTS

| | | | | |
|---|---|---|---|---|
| 2009/0261534 | A1* | 10/2009 | Pradelle | F16J 15/025 |
| | | | | 277/648 |
| 2013/0119617 | A1* | 5/2013 | Alvanos | F01D 11/001 |
| | | | | 277/628 |
| 2013/0323061 | A1* | 12/2013 | Jacquemont | F16C 33/782 |
| | | | | 416/174 |

* cited by examiner

KNIFE EDGE SEAL TREE

CROSS-REFERENCE TO RELATED APPLICATIONS

This application is a nonprovisional of, and claims priority to, and the benefit of U.S. Provisional Application No. 62/089,108, entitled "KNIFE EDGE SEAL TREE," filed on Dec. 8, 2014, which is hereby incorporated by reference in its entirety.

FIELD

The present disclosure relates generally to seals, and more particularly to seals for axially sealing an area of low pressure from an area of high pressure.

BACKGROUND

A gas turbine engine may include a turbine section with multiple rows or stages of stationary stator vanes and rotating rotor blades. These vanes and blades may be separated by a small gap to allow for variations in manufacturing tolerances and other reasons. This gap may allow fluid to flow from an area having a relatively high pressure to an area having a relatively low pressure. It may be desirable to place a seal within the gap to reduce the flow of fluid.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a tree seal for use on a rotating element. The tree seal includes a trunk configured to be coupled to the rotating element. The tree seal also includes a first branch coupled to the trunk and having a first edge configured to form a first mini seal with a housing. The tree seal also includes a second branch coupled to the trunk and having a second edge configured to form a second mini seal with the housing.

Also described is an apparatus for use on a rotating element. The apparatus includes a housing coupled to an endwall. The apparatus also includes a first portion positioned in the housing and coupled to the rotating element. The apparatus also includes a first edge positioned in the housing, coupled to the first portion and configured to form a first mini seal with the housing. The apparatus also includes a second edge positioned in the housing, coupled to the first portion and configured to form a second mini seal with the housing.

Also described is a system for reducing a flow of fluid. The system includes a rotating element configured to rotate about an axis. The system also includes an endwall configured to remain in a same angular position relative to the axis. The system also includes a housing coupled to the endwall. The system also includes a tree seal coupled to the rotating element and positioned within the housing. The tree seal includes a trunk connected to the rotating element. The tree seal also includes a first edge coupled to the trunk and configured to form a first mini seal with the housing. The tree seal also includes a second edge coupled to the trunk and configured to form a second mini seal with the housing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
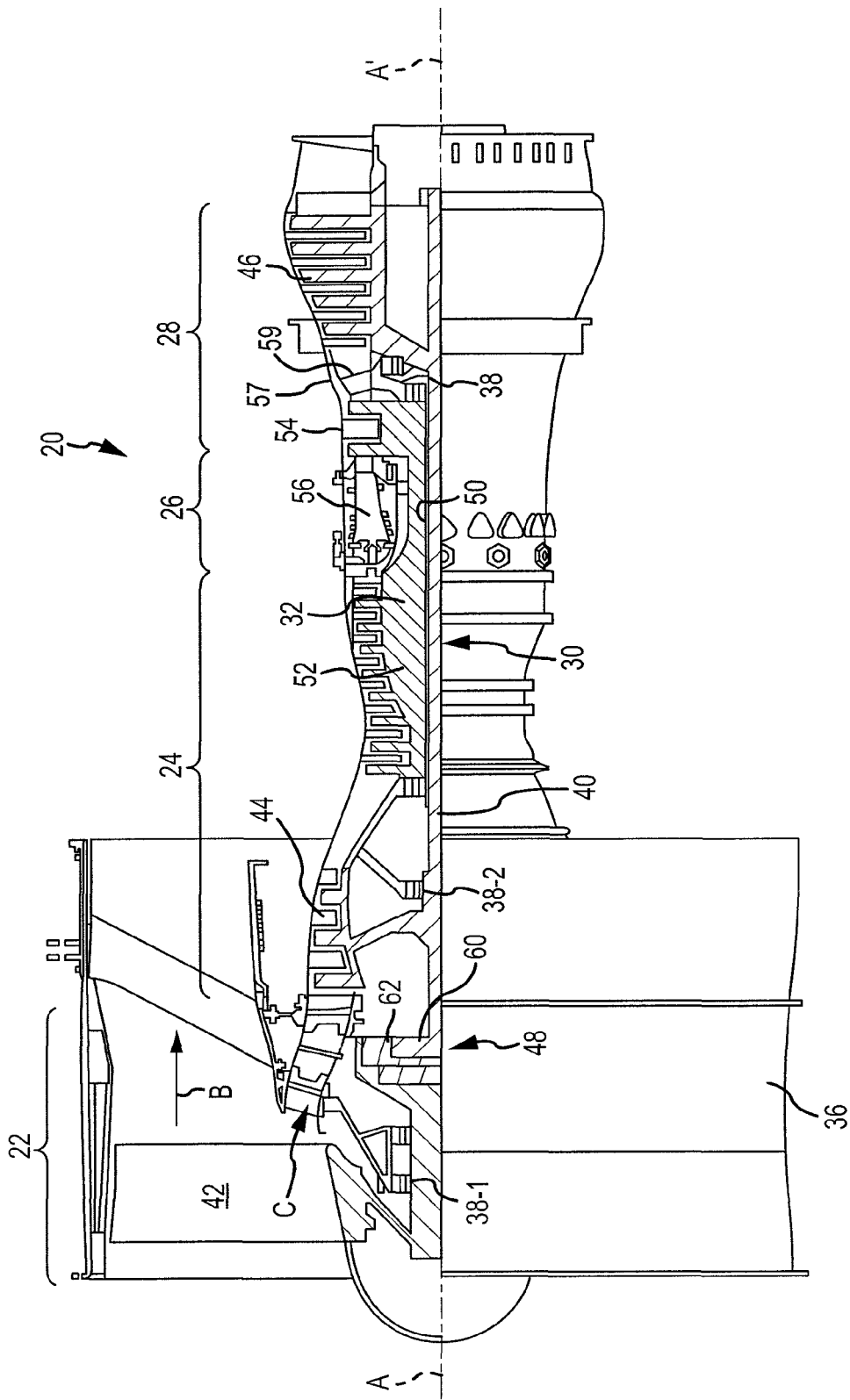
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28 Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency which use higher pressure ratios and higher temperatures in high pressure compressor 52 than are conventionally experienced. These higher operating temperatures and pressure ratios may create operating environments that may cause thermal loads that are higher than the thermal loads conventionally experienced, which may shorten the operational life of current components.

Figure 2:
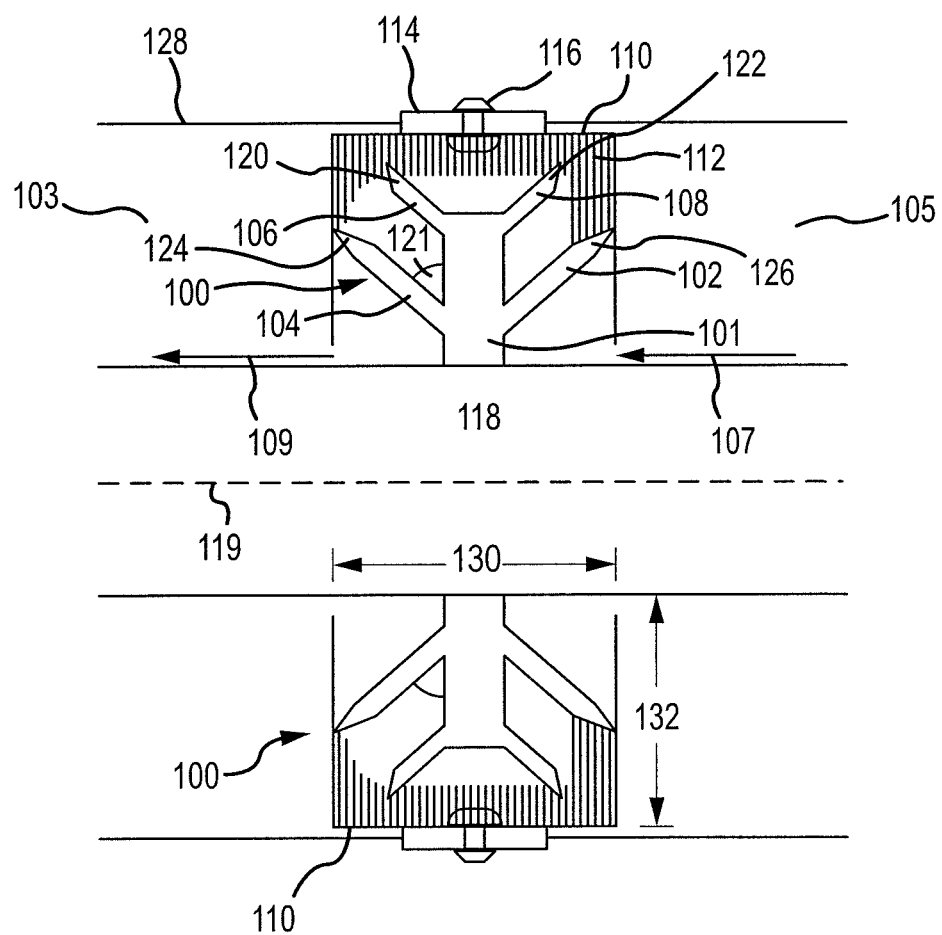
FIG. 2 illustrates a tree seal that is adapted to seal an area of relatively low pressure from an area of relatively high pressure in accordance with various embodiments.

It may be desirable to seal an area of low pressure from an area of high pressure, such as between stages in compressor section 24 or turbine section 28. FIG. 2 illustrates a tree seal 100 that is adapted to seal an area of relatively low pressure 103 from an area of relatively high pressure 105. In that regard, as used herein, area of relatively low pressure 103 has a pressure lower than area of relatively high pressure 105. Tree seal 100 may be utilized in a turbine, a compressor or any other system having a rotating element. Tree seal 100 tends to reduce fluid leakage between area of relatively low pressure 103 and area of relatively high pressure 105.

Tree seal 100 is positioned annularly about a shaft 118 that rotates about an axis 119. Tree seal 100 extends radially out from shaft 118 and circumferentially surrounds shaft 118. Tree seal 100 may be coupled to shaft 118 such that when shaft 118 rotates about axis 119, tree seal 100 rotates at the same angular velocity as shaft 118.

As an example, tree seal 100 may be comprised of metal or plastic or other material capable of exceeding 300 degrees Fahrenheit (300° F., 149° C.) or the like. The material may be selected based on temperature and pressure ranges of the area around tree seal 100. For example, if tree seal 100 is positioned in area of relatively high pressure and temperature, such as high pressure compressor 52 or high pressure turbine 54, tree seal 100 may comprise titanium, nickel or alloys thereof, such as Inconel® which is available from Special Metals Corporation of New Hartford, N.Y., USA.

Tree seal 100 includes a trunk 101, a branch 102, a branch 104, a branch 106 and a branch 108. Trunk 101 may be positioned adjacent shaft 118. In various embodiments, trunk 101 is substantially perpendicular to a surface of shaft 118. In various embodiments, trunk 101 may form any angle with a surface of shaft 118.

Branch 102, branch 104, branch 106 and branch 108 are each coupled to trunk 101 and have no direct contact with a surface of shaft 118. In various embodiments, a branch may be coupled or connected to another branch instead of a trunk. The branches may extend radially, axially and/or tangentially away from trunk 101. For example, branch 104 extends away from trunk 101 at an angle 121. In various embodiments, angle 121 may be any angle between 0 degrees) (0°) and 180°.

Tree seal 100 may be substantially enclosed within a housing 110. Housing 110 may be coupled to an end wall 128 via a bracket 114 and a rivet 116. Housing 110 may be coupled to end wall 128 in any manner. Typically, housing 110 and end wall 128 do not rotate about axis 119.

Each branch includes an edge that is adapted to form a mini seal with housing 110. A mini seal indicates that the edge is adequately near housing 110 to reduce a flow of fluid. For example, branch 104 has an edge 124. Any discussion of edge 124 is applicable to other edges of tree seal 100. In various embodiments, edge 124 may be a knife edge and housing 110 may include honeycomb 112. Honeycomb 112 may be constructed of an abradable material such that edge 124 causes portions of honeycomb 112 to dislodge when tree seal 100 rotates about axis 119. When first constructed, honeycomb 112 may extend into an area in which tree seal 100 will be positioned. Upon the first rotations of tree seal 100 about axis 119, the knife edges of tree seal 100 will reshape honeycomb 112. Afterwards, honeycomb 112 may surround a portion of edge 124. This forms a mini seal around edge 124 between edge 124 and honeycomb 112.

In embodiments where the edges are knife edges and the housing includes honeycomb, it may be preferable to harden the knife edges and/or the branches. This hardening of the edges will decrease the likelihood of damage to the edges when the edges interact with the honeycomb. The edges may be hardened using any technique, such as precipitation hardening, work hardening, solid solution strengthening or the like. In various embodiments, instead of or in addition to hardening the edges, the edges and/or the branches may be coated with a material that will strengthen the edges and/or the branches.

In various embodiments, trunk 101 may have an edge that forms a mini seal between housing 110 and the edge of trunk 101. In these embodiments, trunk 101 may be considered to include a branch. A branch may be any portion of tree seal 100 having an edge that, together with housing 110, creates a mini seal between area of relatively high pressure 105 and area of relatively low pressure 103. A trunk may be any portion of tree seal 100 that extends radially out from shaft 118 and is connected to at least one branch. A tree seal may be considered any seal surrounding an axis of rotation that includes at least one trunk and at least two branches. In other words, a tree seal may include a first portion coupled to a shaft, a second portion coupled to the first portion and having an edge forming a mini seal with a housing and a third portion coupled to the first portion and having an edge forming a mini seal with the housing. Various embodiments of a tree seal may include a trunk having an edge forming a mini seal with a housing and an additional branch connected to the trunk and forming a mini seal with the housing.

In FIG. 2, tree seal 100 separates area of relatively high pressure 105 from area of relatively low pressure 103. Without tree seal 100, fluid may flow freely from area of relatively high pressure 105 towards area of relatively low pressure 103 as indicated by arrow 107 and arrow 109. With tree seal 100, the fluid must flow past each mini seal in order to reach area of relatively low pressure 103. Tree seal 100 may not eliminate all fluid flow between area of relatively high pressure 105 and area of relatively low pressure 103, however tree seal 100 will at least reduce the flow rate of fluid.

Tree seal 100 has a distance 130 in the axial direction and a distance 132 in the radial direction. Tree seal 100 may include more mini seals over an axial distance (such as distance 130) than traditional seals.

Figure 3:
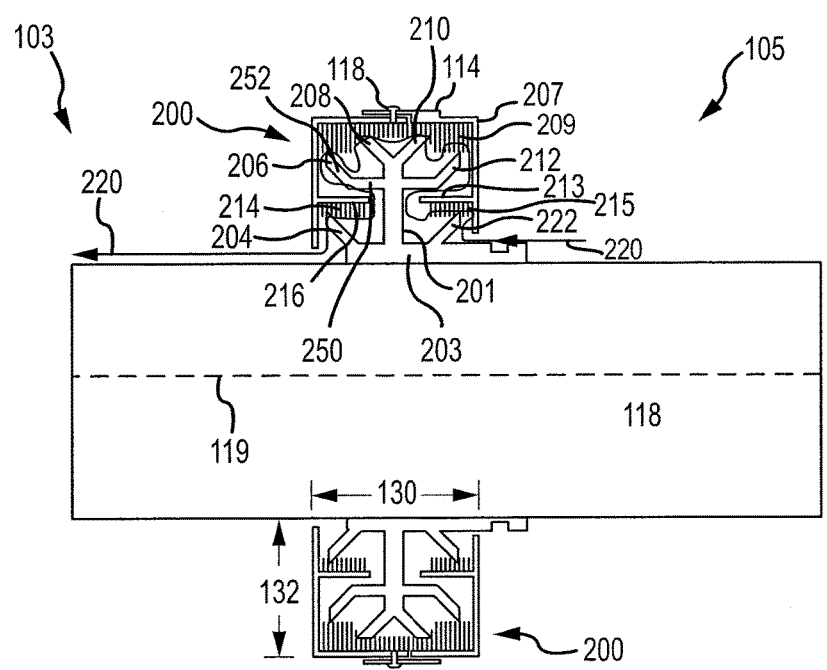
FIG. 3 illustrates various embodiments of a tree seal in accordance with various embodiments.

FIG. 3 illustrates various embodiments of a tree seal 200. Tree seal 200 is positioned circumferentially about and radially outward from shaft 118. Tree seal 200 is similar to tree seal 100 except tree seal 200 includes six branches instead of four, and two branches of tree seal 200 include bends. As with tree seal 100, tree seal 200 may rotate about axis 119.

Housing 207 includes honeycomb 209, 214 and 215. Housing 207 may include a support 213 and a support 216 for additional honeycomb 214 and honeycomb 215. The portion of housing 207 directly connected to honeycomb 209 may be considered a base portion of housing 207. Because the edge of branch 206 is positioned substantially at the same position axially and radially outward from the edge of branch 204, additional honeycomb 214 is present so that the edge of branch 204 can form another mini seal with housing 207.

As tree seal 200 rotates about axis 119, the edges of branch 208, branch 210, branch 212 and branch 206 may cut into honeycomb 209, forming mini seals. Similarly, the edge of branch 204 may cut into honeycomb 214, forming a mini seal and the edge of branch 222 may cut into honeycomb 215, forming a mini seal.

Tree seal 200 includes a base 203 connected to a trunk 201, a branch 204 and a branch 222. In various embodiments, base 203 may be considered a portion of trunk 201.

Trunk 201 is connected to a branch 212, a branch 210, a branch 208 and a branch 206. As illustrated in FIG. 2, the branches need not be straight. For example, branch 206 includes a first portion 250 and a second portion 252. First portion 250 extends axially away from trunk 201 at a ninety (90) degree angle. Second portion 252 extends radially and axially away from first portion 250. Each branch may include any number of portions forming any angles with trunks and other portions of the branch.

Tree seal 200 has an axial distance 130 that is the same as distance 130 of tree seal 100. Similarly, tree seal 200 has a radial distance 132 that is the same as radial distance 132 of tree seal 100. Tree seal 200 includes six branches having edges adjacent to honeycomb that form mini seals whereas tree seal 100 includes four branches adjacent to honeycomb that form mini seals. Tree seal 200 includes an increased number of mini seals throughout the same area as tree seal 100. Thus, tree seal 200 may be preferable to tree seal 100.

An arrow 220 indicates a path in which fluid may flow to get to area of relatively low pressure 103 from area of relatively high pressure 105. As indicated, the fluid may first enter housing 110. The fluid may then pass through mini seals between branch 222 and honeycomb 215, branch 212 and honeycomb 209, branch 210 and honeycomb 209, branch 208 and honeycomb 209, branch 206 and honeycomb 209, and branch 204 and honeycomb 214. Any fluid capable of passing through each of these mini seals may then enter area of relatively low pressure 103.

Figure 4A:
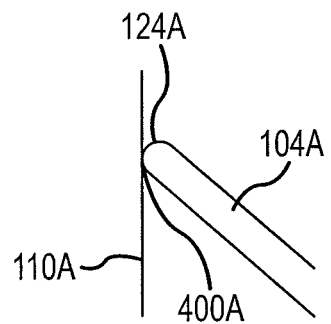
FIG. 4A illustrates a branch having a smooth edge in accordance with various embodiments.

As mentioned above and with reference to FIG. 2, edge 120, edge 122, edge 124 and edge 126 need not be knife edges. FIG. 4A illustrates a branch 104A having a smooth edge 124A. A smooth edge refers to any edge not intended to cut into a material of a housing. Smooth edge 124A is positioned adjacent (i.e., immediately next to or within a predetermined distance of) a portion of a housing 110A forming a mini seal 400A. In various embodiments, smooth edge 124A may or may not contact portion of housing 110A. Mini seal 400A may be sufficient to prevent a large volume of fluid from leaking between smooth edge 124A and portion of housing 110A.

Figure 4B:
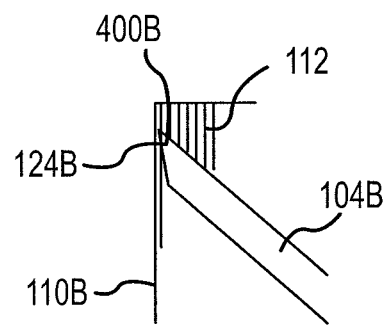
FIG. 4B illustrates a branch having a knife edge in accordance with various embodiments.

FIG. 4B illustrates a branch 104B having a knife edge 124B. A portion of a housing 110B includes honeycomb 112. During the first rotation of branch 104B about an axis, knife edge 124B will cut honeycomb 112 to form a mini seal 400B. Selection of smooth edge 124A or knife edge 124B may be based on quality of seal, cost of manufacture, etc. In various embodiments, any type of edge may be used with tree seal.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tree seal for use on a rotating element, the tree seal comprising:
   a trunk configured to be coupled to the rotating element;
   a first branch coupled to the trunk and having a first edge configured to form a first mini seal with a housing; and
   a second branch coupled to the trunk and having a second edge configured to form a second mini seal with the housing,
   wherein the tree seal comprises at least one of a plastic or a metal;
   the tree seal is configured to reduce a flow of a fluid between a first area having a first pressure and a second area having a second pressure, the first pressure is greater than the second pressure; and
   wherein at least one of the first edge and the second edge comprises a knife edge configured to abrade a honeycomb material,
   wherein the tree seal is positioned annularly about the rotating element.

2. The tree seal of claim 1, wherein the other of the first edge and the second edge is a smooth edge.

3. The tree seal of claim 1, wherein the knife edges are hardened for prevention of damage to the knife edges by the honeycomb material.

4. The tree seal of claim 1, wherein the tree seal is configured to rotate at a same angular velocity as the rotating element.

5. The tree seal of claim 1, further comprising a base configured to be connected to the rotating element and the trunk.

6. The tree seal of claim 5, further comprising a third branch coupled to the base and having a third edge configured to form a third mini seal with the housing and a fourth branch coupled to the base and having a fourth edge configured to form a fourth mini seal with the housing.

7. The tree seal of claim 6, further comprising a fifth branch coupled to the trunk and having a fifth edge configured to form a fifth mini seal with the housing and a sixth branch coupled to the trunk and having a sixth edge configured to form a sixth mini seal with the housing.

8. An apparatus comprising:
   a housing coupled to an endwall;
   a first portion positioned in the housing and coupled to a rotating element;
   a first edge positioned in the housing, coupled to the first portion and configured to form a first mini seal with the housing; and
   a second edge positioned in the housing, coupled to the first portion and configured to form a second mini seal with the housing,
   wherein the housing is configured to form the first mini seal with the first edge;
   wherein the housing includes a support portion extending from the housing towards the first portion, the support portion configured to form the second mini seal with the second edge; and
   the housing includes a honeycomb material coupled to the housing, the honeycomb material configured to form the first mini seal with the first edge.

9. The apparatus of claim 8, wherein the first edge and the second edge are knife edges.

10. The apparatus of claim 8, wherein the first edge and the second edge are smooth edges.

11. The apparatus of claim 8, wherein the apparatus is configured to be used in at least one of a high pressure compressor or a high pressure turbine.

12. The apparatus of claim 8, wherein the first portion, the first edge and the second edge include at least one of titanium, nickel or alloys thereof.

13. A system for reducing a flow of fluid comprising:
   a rotating element configured to rotate about an axis;
   an endwall configured to remain in a same angular position relative to the axis;
   a housing coupled to the endwall, wherein the housing includes a honeycomb material coupled to the housing, and
   a tree seal coupled to the rotating element, positioned within the housing and including:
   a trunk connected to the rotating element,
   a first edge coupled to the trunk and configured to form a first mini seal with the housing, and
   a second edge coupled to the trunk and configured to form a second mini seal with the housing, wherein the first edge and the second edge are knife edges configured to abrade the honeycomb material to form the first mini seal and the second mini seal, wherein a first portion of the housing extends radially inward and axially forward of the first edge and the second edge and a second portion of the housing extends radially inward and axially aft of the first edge and the second edge.

14. The system of claim 13, wherein the knife edges are hardened for prevention of damage to the knife edges by the honeycomb material.

15. The system of claim 13, wherein the tree seal includes at least one of titanium, nickel or alloys thereof.

16. The apparatus of claim 8, wherein the support portion includes an additional honeycomb material coupled to the support portion, the additional honeycomb material configured to form the second mini seal with the second edge.

17. The apparatus of claim 8, wherein the support portion extends in a substantially axial direction.

* * * * *